(12) United States Patent
Pfeilschifter et al.

(10) Patent No.: US 12,122,254 B2
(45) Date of Patent: Oct. 22, 2024

(54) CHARGING AND HEATING CIRCUIT AND VEHICLE ELECTRICAL SYSTEM HAVING A CHARGING AND HEATING CIRCUIT

(71) Applicant: Vitesco Technologies GmbH, Regensburg (DE)

(72) Inventors: Franz Pfeilschifter, Munich (DE); Martin Götzenberger, Munich (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 177 days.

(21) Appl. No.: 17/793,740

(22) PCT Filed: Jan. 20, 2021

(86) PCT No.: PCT/EP2021/051102
§ 371 (c)(1),
(2) Date: Jul. 19, 2022

(87) PCT Pub. No.: WO2021/148424
PCT Pub. Date: Jul. 29, 2021

(65) Prior Publication Data
US 2023/0096572 A1    Mar. 30, 2023

(30) Foreign Application Priority Data

Jan. 23, 2020 (DE) .................... 10 2020 200 794.2

(51) Int. Cl.
*B60L 58/27* (2019.01)
*B60L 1/00* (2006.01)
(Continued)

(52) U.S. Cl.
CPC .............. *B60L 53/22* (2019.02); *B60L 58/27* (2019.02); *H02M 7/219* (2013.01); *B60L 1/003* (2013.01);
(Continued)

(58) Field of Classification Search
CPC ........ B60L 58/27; B60L 2210/10; B60L 1/14; B60L 1/02; B60L 1/003; H02M 7/219
(Continued)

(56) References Cited

U.S. PATENT DOCUMENTS

2021/0265855 A1    8/2021    Pfeilschifter et al.

FOREIGN PATENT DOCUMENTS

DE          69012436 T2     2/1995
DE       102017002892 A1    9/2018
(Continued)

OTHER PUBLICATIONS

International Search Report and Written Opinion for International Application No. PCT/EP2021/051102, mailed Apr. 26, 2021, with partial English translation, 9 pages.
(Continued)

*Primary Examiner* — Michael R. Fin
(74) *Attorney, Agent, or Firm* — Buchanan Ingersoll & Rooney PC

(57) ABSTRACT

A charging and heating circuit is equipped with an AC voltage connection, a DC voltage connection and a rectifier. The rectifier is connected between the AC voltage connection and the DC voltage connection. The charging and heating circuit further includes a heating resistor which is connected to the rectifier and the rectifier is thereby set up to supply the heating resistor with current. Also described is a vehicle electrical system which includes the charging and heating circuit in addition to an accumulator.

11 Claims, 1 Drawing Sheet

(51) Int. Cl.
   *B60L 1/02* (2006.01)
   *B60L 1/14* (2006.01)
   *B60L 53/22* (2019.01)
   *H02M 7/219* (2006.01)

(52) U.S. Cl.
   CPC . *B60L 1/02* (2013.01); *B60L 1/14* (2013.01); *B60L 2210/10* (2013.01)

(58) Field of Classification Search
   USPC .................................................. 307/10.1, 9.1
   See application file for complete search history.

(56) References Cited

FOREIGN PATENT DOCUMENTS

| | | | | |
|---|---|---|---|---|
| DE | 102018203489 A1 | * | 9/2019 | ................ B60L 3/00 |
| DE | 102018208264 A1 | | 11/2019 | |
| DE | 102018210579 A1 | | 1/2020 | |
| DE | 102018210781 A1 | | 1/2020 | |

OTHER PUBLICATIONS

International Search Report and Written Opinion for International Application No. PCT/EP2021/051102, mailed Apr. 26, 2021, 14 pages (German).
German Examination Report for German Application No. 10 2020 200 794.2, dated Oct. 8, 2020, with English translation, 11 pages.
Office Action (Notice to Submit Response) issued Apr. 22, 2024, by the Korean Intellectual Property Office in corresponding Korean Patent Application No. 10-2022-7028150 and an English translation of the Office Action. (7 pages).

* cited by examiner

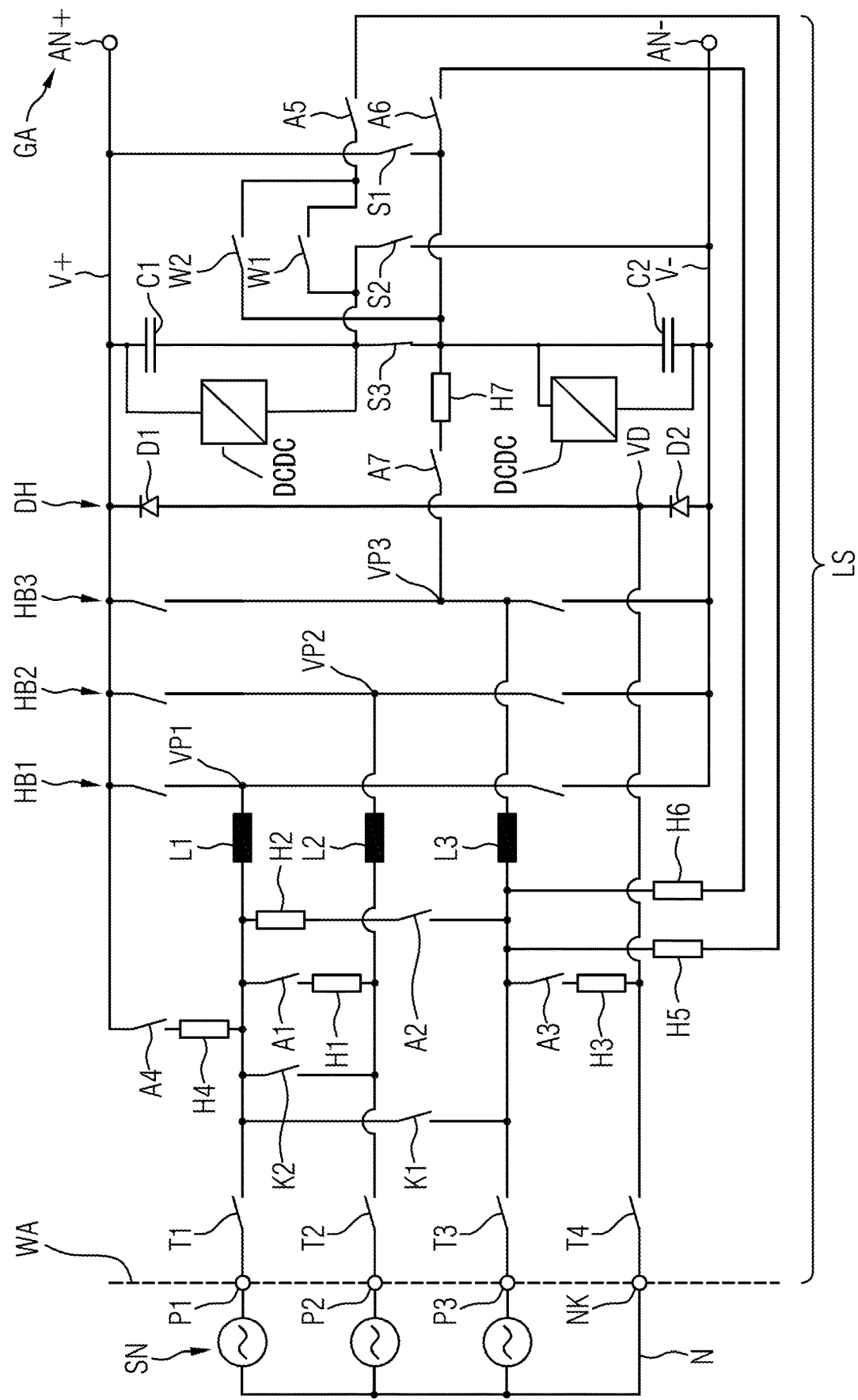

CHARGING AND HEATING CIRCUIT AND VEHICLE ELECTRICAL SYSTEM HAVING A CHARGING AND HEATING CIRCUIT

CROSS REFERENCE TO RELATED APPLICATIONS

This application is the U.S. National Phase Application of PCT International Application No. PCT/EP2021/051102, filed Jan. 20, 2021, which claims priority to German Patent Application No. 10 2020 200 794.2, filed Jan. 23, 2020, the contents of such applications being incorporated by reference herein.

BACKGROUND OF THE INVENTION

Electric vehicles and hybrid vehicles have an energy store that keeps the electrical energy available for driving. In order to be able to charge this battery from the outside, there are charging circuits to control the power flow during charging, to set a suitable charging voltage or a suitable charging current or else to convert an AC voltage to a DC voltage which can be used to charge the battery. Due to the high charging power, cost-intensive power circuits and power components are necessary for this.

The battery not only has to support an electric drive, but is also used as a power supply for many secondary consumers. For example, inductive loads such as pumps or else resistive loads such as lighting or electrical heating (of the interior, a drive cooling circuit or a catalytic converter) are supplied by the battery. Here, too, it is necessary to be able to set the current that flows from the battery to the secondary consumers, with the battery voltage possibly also having to be adjusted by voltage conversion. Since these secondary consumers also have significant powers, power circuits for setting the power or the current of the secondary consumers must also be provided here.

SUMMARY OF THE INVENTION

It is an aim of an aspect of the invention to implement the function of the charging and the controlled supply of secondary consumers in a cost-effective manner.

A charging and heating circuit is proposed in which a rectifier between an AC voltage connection and a DC voltage connection permits the use of AC voltage as input voltage in order to charge a battery via the DC voltage connection. At the same time, this circuit also implements the function of the controlled supply of a secondary consumer, namely a heating resistor which is connected to the rectifier. As a result, the rectifier is set up to supply the heating resistor with current in a controlled manner. The rectifier is preferably a controlled rectifier which actuates switching elements or half-bridges relevant for charging in order to rectify the AC voltage applied to the AC voltage connection and to set the (rectified) voltage at the DC voltage connection, with at least one of these elements also being used to supply the heating resistor with current in a controlled manner. At least one of the half-bridges or switches located there is thus used not only for charging (that is to say for rectification) but also for setting the power that is supplied to the heating resistor, in particular by switching the relevant component with pulse-wave modulation, for example.

The charging and heating circuit proposed here is part of a vehicle electrical system or is provided in a vehicle. The AC voltage connection is in particular of three-phase design, but can also be of single-phase design. The AC voltage connection can be in the form of a standardized charging socket or have a connecting element which is set up to be connected to a standardized charging socket. A charging socket is generally referred to here as a charging connection which is designed in particular according to a standard for wired charging for vehicles.

The circuit shown here is preferably designed for a high-voltage range, that is to say for an operating voltage of at least 200, 400 or 800 volts. The circuit is also designed for a rated power of at least 1 kW, 5 KW, 10 KW or 20 kW. In particular, the rectifier can have a rated power of at least 3, 10 or 20 kW. The heating resistor may be a power resistor with a rated power of at least 500 W, 1 kW, 2 KW, 5 KW or 10 kW. The rectifier is in particular a semiconductor rectifier. The rectifier is preferably a full-wave rectifier and in particular is of multi-phase design. The rectifier may be in the form of a B6C bridge or may comprise such a bridge. At least one connection of the heating resistor is connected to the rectifier, in particular to a potential of the output, of the input or to a connecting point (between two switching elements) of a half-bridge of the rectifier.

One possibility is that the heating resistor is connected to an input of the rectifier. This input is preferably connected to the AC voltage connection, either directly or indirectly (for example via an inductance). Another possibility is that the heating resistor is connected to an output of the rectifier. This output is preferably connected to the DC voltage connection. Furthermore, provision can be made for the heating resistor to connect an input of the rectifier and an output of the rectifier, in particular an input connected directly to the AC voltage connection, or an inductance leading to the input, to the output, that is to say a potential of the DC voltage connection or to a circuit which is provided at the output of the rectifier, for example a configuration circuit. In this case, the heating resistor is preferably connected directly, that is to say not via an inductance or a resistor.

The heating resistor is preferably connected to the rectifier via a switch. The switch may be an electromechanical switch or a semiconductor switch. In particular, the switch may be a switching element of a DC-DC converter whose working inductance is formed by an inductance by means of which the AC voltage connection is connected to the rectifier or to the input thereof. As a result, the switch can on the one hand be used for simple deactivation or activation of the heating resistor and can on the other hand set a desired power according to pulse width modulation, or can also contribute to voltage conversion, which can take place between the AC voltage connection and the rectifier, for example.

The heating resistor can be connected between different phases of the AC voltage connection. In this case, the AC voltage connection and also the rectifier are multi-phase, in particular three-phase. Furthermore, the heating resistor can be connected between one phase of the AC voltage connection and a neutral conductor of the AC voltage connection. In this case, the AC voltage connection can be of single-phase or three-phase design. In addition, the heating resistor can be connected between one phase of the AC voltage connection and the DC voltage connection. In this case, the heating resistor can be connected directly between the phase and the DC voltage connection, or can be connected between the phase and a circuit, in particular a configuration circuit, which is located at the DC voltage connection. The heating resistor is in particular of single-phase design or has two individual connections.

One embodiment makes provision for two capacitors and a configuration circuit to be provided between the DC voltage connection and the rectifier. The capacitors and the configuration circuit can be connected in parallel at the DC voltage connection, in particular a busbar which connects the rectifier to the DC voltage connection. The configuration circuit is set up to connect the capacitors either in parallel or in series with one another. In such embodiments, the heating resistor can be connected between an AC voltage phase of a half-bridge of the rectifier and a configuration switch of the configuration circuit. The AC voltage phase is formed by the connecting point of the switching elements which form the half-bridge. Such an AC voltage phase can be connected directly to a phase of the AC voltage connection, or can be connected thereto via an inductance. Furthermore, the heating resistor can be connected directly or via a selection switch to a configuration switch of the configuration circuit. Such a configuration switch connects the capacitors to one another in a switchable manner. The heating resistor connects this configuration circuit or the relevant configuration switch to a phase of the AC voltage connection.

The configuration circuit can comprise a first configuration switch which connects a first potential of the DC voltage connection to one of the capacitors in a switchable manner, such that said configuration switch connects the second potential of the DC voltage connection to the first potential via the capacitor. A second configuration switch is provided, which in an inverted manner connects the second potential of the DC voltage connection in a switchable manner to the first potential via the further capacitor. These two configuration switches thus connect the different potentials of the DC voltage connection to the respective other potential of the DC voltage connection via the different capacitors. The configuration switch mentioned at the outset, which connects the capacitors to one another in a switchable manner, is referred to as the third configuration switch. The third configuration switch thus connects the first potential via one of the capacitors to the other potential via the other capacitor. The third configuration switch is thus connected to the first potential via a first capacitor and to the second potential of the DC voltage connection via a second capacitor. The third configuration switch is thus located midway between the two capacitors, with the capacitors being connected in series with the third configuration switch. The first configuration switch thus connects the first potential of the DC voltage connection to the side of the third configuration switch that is connected to the second capacitor. The second configuration switch thus connects the second potential of the DC voltage connection to the side of the third configuration switch that is connected to the first potential of the DC voltage connection via the first capacitor. If the third configuration switch is closed, then the two capacitors are connected in series. If it is open and the first and second configuration switches are closed, then the two capacitors are connected in parallel (with this parallel switch being connected in parallel with the DC voltage connection). The heating element can be connected to the configuration circuit on the third configuration switch side that is connected to the first capacitor (leading to the first potential) or can be connected to the third configuration switch side that is connected to the second potential via the second capacitor.

The rectifier has a number of controllable half-bridges. These each comprise two switching elements which are preferably designed as transistors or as semiconductor switches. The two switching elements of the half-bridges are each connected to one another via a connecting point. The connecting point forms the AC voltage phase of the relevant half-bridge. Provision may be made for series inductances to be provided between these AC voltage phases or connecting points of the half-bridges and the phases of the AC voltage connection. These series inductances can be used as filters and can in particular also be used for voltage conversion, in particular when switching elements of the half-bridges operate in a clocked manner in order thus to provide the series inductance as the working inductance of a DC-DC converter.

The series inductances can thus be filter inductances, with at least one of these inductances having the additional function of working inductance of a DC-DC converter, with the relevant switching element of the DC-DC converter being implemented by a switching element of the half-bridges. This enables the use of components intended for charging to implement a further function, namely voltage conversion (in particular step-up conversion) as part of the controlled power supply of the heating element.

The half-bridges connect a positive busbar and a negative busbar. The positive busbar has a first potential and the negative busbar has a second potential. These potentials are potentials of the DC voltage connection. The positive and the negative busbars lead to potential connections of the DC voltage connection.

Provision may be made for the rectifier to comprise a diode bridge. Said diode bridge has two diodes which are connected to one other in series via a connecting point. The neutral conductor contact of the AC voltage connection is preferably connected directly (that is to say not via an inductance) to the connecting point of the diode bridge.

A controller which is connected to the half-bridges in a driving manner can be provided. The controller is set up to actuate the half-bridges in such a way that they rectify an AC voltage applied to the AC voltage connection in order to deliver it to the DC voltage connection. The controller can also be set up to control a switch which is connected via the heating resistor to the rectifier. In this case, the controller can be set up to actuate the switching elements of the half-bridge for rectification in a charging state, while the switches for connecting the heating resistor are open. The controller can be set up, in a heating control state, to actuate the switches of the half-bridges either open or to actuate them according to a predetermined heating power, while the switch which connects the heating resistor to the rectifier is temporarily closed. The controller can be set up, according to a setpoint heating power, either to actuate the switch via which the heating resistor is connected in a clocked manner, to actuate at least one switching element of the half-bridges in a clocked manner in order to achieve the desired setpoint heating power, or both, with both switch components being controlled in accordance with a setpoint heating power. In particular, the controller can be set up to actuate a switching element of the heating bridges in a clocked manner in such a way that, together with the series inductance, a voltage conversion results, in particular a step-up conversion. In addition, the switch via which the heating resistor is connected to the rectifier can be controlled in a clocked manner (by the controller) in such a way that, together with the series inductance, a DC voltage conversion results. The DC voltage conversions mentioned can be actuated in accordance with a predetermined setpoint heating power.

Furthermore, a vehicle electrical system which has a charging and heating circuit as described here is described. The vehicle electrical system also has an accumulator which is connected directly or indirectly to the DC voltage connection of the charging and heating circuit. The accumulator can be connected directly, that is to say without voltage conversion, to the DC voltage connection, or can be connected via at least one voltage converter (that is to say indirectly) to the DC voltage connection of the charging and heating circuit.

One embodiment makes provision for the accumulator of the vehicle electrical system to be connected to the DC voltage connection of the charging and heating circuit via two DC-DC converters. The DC-DC converters comprise link circuit capacitors which are formed by capacitors in the charging and heating circuit. The charging and heating circuit therefore comprises capacitors which, within the vehicle electrical system, are link circuit capacitors of DC-DC converters. In this case, the charging and heating circuit preferably comprises the configuration circuit described herein. Said configuration circuit is set up to connect the link circuit capacitors or inputs of the DC-DC converters selectably in parallel or in series with one another. With a parallel connection, the inputs of the DC-DC converters are connected in parallel and the link circuit capacitors are also connected in parallel. This is advantageous in the case of a first DC voltage at the DC voltage connection which is lower than a second DC voltage. In the case of the second, higher DC voltage, the link circuit capacitors are preferably connected to one another in series. As a result, only half of the voltage at the DC voltage connection drops at each one of the link circuit capacitors, such that they have to be designed with a lower rated voltage (if the entire voltage is applied to only one capacitor). The controller is set up, in the case of single-phase operation of the rectifier, to set the configuration circuit in such a way that the link circuit capacitors are connected in parallel (which results in a higher capacitance), and in the case of three-phase operation to actuate the configuration circuit in such a way that the link circuit capacitors are connected to one another in series in order thus to be able to distribute the higher DC voltage due to the higher number of phases to both capacitors (according to a voltage divider).

The controller mentioned here is thus set up to also set the configuration circuit, preferably depending on the number of phases of the voltage rectified by the rectifier. Provision may be made for two or more half-bridges to receive the same voltage, but in this case only single-phase operation can be assumed and the rectified voltage is therefore just as high as when the rectifier is operated with only one active half-bridge. Combination switches which connect different phases of the AC voltage input to one another can be provided, such that an applied (single-phase) voltage is distributed over a number of half-bridges. Isolating switches can be provided between the half-bridges and the AC voltage connection, in particular between the phase connections of the AC voltage connection and the combination switches mentioned.

BRIEF DESCRIPTION OF THE DRAWINGS

The FIGURE serves to provide a more detailed explanation of examples of a charging and heating circuit and of a vehicle electrical system, as is described here.

DETAILED DESCRIPTION OF THE PREFERRED EMBODIMENTS

The FIGURE shows a charging and heating circuit LS which comprises an AC voltage connection WA. Said AC voltage connection is connected to an external three-phase voltage source SN via phases P1 to P3. The voltage source SN is shown in a star configuration, with the star point being led out via a neutral conductor N. The AC voltage connection WA also comprises a neutral conductor connection which is connected to said neutral conductor of the voltage source SN. The voltage source SN can be formed by an AC voltage supply network, for example.

The circuit LS also comprises a DC voltage connection GA with a positive potential connection AN+ (corresponding to a positive potential V+) and a negative potential connection AN− (corresponding to a negative potential V−). The AC voltage connection is connected to a rectifier via isolating switches T1 to T4 (for the three phases individually and for the neutral conductor connection NK) and via series inductances L1 to L3. The rectifier comprises three half-bridges HB1 to HB3 which are each fully switchable. The relevant connecting points within the half-bridges HB1 to HB3 between the two switching elements of the half-bridges are connected to the AC voltage connection WA via the respective series inductance L1 and the isolating switches T1 to T4. Diode bridge DH has two diodes D1 and D2, which are connected in series via connecting point VD of the diode bridge DH and to positive potential connection AN+ and a negative potential connection AN−.

A configuration circuit with two switches S1, S2 is connected to two capacitors C1 and C2 in order to be able to set their configuration (series or parallel). A first switch S1 of the configuration circuit is connected to the first potential AN+(positive potential) of the DC voltage connection. A second switch S2 is connected to the second potential, that is to say the negative potential AN− of the DC voltage connection GA. A first capacitor C1 is connected directly to the first potential V+(that is to say to the first busbar) and via the second switch to the second potential V− (that is to say to the second busbar).

A second capacitor C2 is connected to the second potential V− directly and to the first potential V+ (that is to say to the positive potential) via the first switch S1. The two capacitors are thus alternately connected to the different potentials V+, V− via the two switches S1, S2. A third switch S3 connects the two capacitors together (in series) in a switchable manner. The switches S1 to S3 permit a parallel or a series configuration to be set selectively. The switches S1 and S2 on the one hand and the switch S3 on the other hand are alternately closed and opened. If the switches S1, S2 are closed, the switch S3 is open. If the switch S3 is closed, the switches S1 and S2 are open.

Other options for connecting heating resistors H1 to H7 are also shown. Said heating resistors can be provided individually or in any desired combination with one another.

A first option is to connect a heating element H1 to the phases P1 and P2, that is to say to different phases of the AC voltage connection WA, in particular via a switch H1 via which the heating element can be activated or deactivated. In this case, the heating element H1 and the associated switch A1 are not connected directly to the phases P1 and P2 of the AC voltage connection, but via the isolating switches T1 and T2. Another example of such a configuration is the heating resistor H2 connected between the first phase P1 and the third phase P3. It is also possible to connect a heating element to the second or third phase, preferably via an associated switch, with the second heating resistor H2 being connected to the third phase P3 (via the isolating switch T3) via an associated switch A2. Switches K1, K2 provide a switchable connection of phases P1 and P2, respectively, with phase P3 between the isolating switches T1-T3 and the series inductances L1 to L3. This allows to use only one phase as input for the half-bridges HB1-HB3, DH.

A further option is the connection of a heating resistor H3 between the neutral conductor connection NK (via an isolating switch T4) of the AC voltage connection WA and one of the phases, in particular the third phase P3, as shown here using switch A3. The isolating switches T1 to T3 are basically optional, but are preferably implemented in order to enable disconnection of the AC voltage connection in the event of a fault. The heating resistor H3 receives the single root mean square voltage of the voltage source SN, while the heating resistors H1 and H2 receive the line-to-line voltage.

Another option is shown with the heating resistor H4 which is connected between one phase of the AC voltage connection (here: the first phase P1 and the DC voltage connection GA, in particular a busbar or a potential AN+ of the DC voltage connection). The fourth switch H4 is also connected via its own switch A4 and can therefore be switched. The switches via which the heating resistors are connected are also optional.

The heating resistors H5 and H6 are connected (via the third isolating switch T3) between one phase (here: third phase P3) of the AC voltage connection and the configuration circuit. In this case, the heating resistor H5 is connected between the third phase P3 and one side of the third switch S3 of the configuration circuit. Switch A5 is connected in series to heating resistor H5 and can be used to switch the heating resistor H5, depending on the selection provided by selection switches W1 and W2. The selection switches W1 and W2 can be used to select whether the heating resistor H5 is connected to the side of the third switch that is connected to the positive potential V+ (corresponding to the first busbar AN+) of the DC voltage connection via the first capacitor C1, or via the changeover switch W2 and is thus connected via the second capacitor C2 to the negative potential V− or AN− of the DC voltage connection. The selection switches W1 and W2 are alternately closed, but never simultaneously. However, the two switches could both be open.

The heating resistor H6 is not connected via selection switches W1, W2, but rather directly (in particular only via the switch A6) to a specific side of the switch S3, namely to the side which is connected to the negative potential V− or AN− of the DC voltage connection via the second capacitor. It is even possible that this connection cannot be selected with the first capacitor C1 which connects the relevant heating resistor to the positive potential V+ or AN+ of the DC voltage connection GA.

Another option is to connect the heating resistor, in this case heating resistor H7, between a connecting point VP3 of a half-bridge HB3 and one side of the third switch S3 or the configuration circuit. Switch A7 is connected in series with heating resistor H7 and connects heating resistor H7 to the AC voltage phase VP3 of the half-bridge HB3. Instead of connecting the heating resistor between a connecting point VP3 or an AC voltage phase of a half-bridge and the configuration circuit, as shown with the heating resistor H7, a heating resistor can also be connected between another AC voltage phase (connecting point VP1 or VP2) of another half-bridge HB1, HB2 and the configuration circuit. In addition, it is possible to connect such a heating resistor to the side of the third switch S3 which is connected to the positive potential AN+ of the DC voltage connection GA via the first capacitor C1.

An accumulator, or a vehicle electrical system or also DC-DC converters which lead to an accumulator, can be connected directly to the DC voltage connection GA. A working inductance and a working switch of a DC-DC converter can be provided in each case in parallel with the capacitances C1 and C2 which together with the respective capacitors C1, C2 form a DC-DC converter. The DC-DC converter can be DC-isolating or DC-conducting. The relevant DC-DC converters are preferably designed in the same way, but can also be designed differently, with the capacitors C1 and C2 preferably being the link circuit capacitors of different converters, which can be configured in parallel or in series with one another using the configuration circuit. This configuration refers to the inputs of the DC-DC converters. The capacitors C1 and C2 can also be designed in the same way and in particular have the same rated capacitance value.

The invention claimed is:

1. A charging and heating circuit comprising:
an AC voltage connection;
a DC voltage connection; and
a rectifier which is connected between the AC voltage connection and the DC voltage connection;
a heating resistor which is connected to the rectifier and the rectifier to supplies the heating resistor with current; and
two capacitors and a configuration circuit are provided between the DC voltage connection and the rectifier, wherein the configuration circuit is set up to connect the capacitors either in parallel or in series with one another, and the heating resistor is connected between an AC voltage phase of a half-bridge of the rectifier and a configuration switch of the configuration circuit, or the heating resistor is connected directly or via a selection switch to a configuration switch of the configuration circuit, which configuration switch connects the capacitors to one another in a switchable manner and also connects said configuration circuit to a phase of the AC voltage connection.

2. The charging and heating circuit as claimed in claim 1, wherein the heating resistor is connected to an input of the rectifier which is connected to the AC voltage connection, or the heating resistor is connected to an output of the rectifier which is connected to the DC voltage terminal, or the heating resistor connects an input of the rectifier to an output of the rectifier.

3. The charging and heating circuit as claimed in claim 1, wherein the heating resistor is connected to the rectifier via a switch.

4. The charging and heating circuit as claimed in claim 1, wherein the heating resistor is connected between different phases of the AC voltage connection, the heating resistor is connected between one phase of the AC voltage connection and a neutral conductor connection of the AC voltage connection, or the heating resistor is connected between a phase of the AC voltage connection and the DC voltage connection.

5. The charging and heating circuit as claimed in claim 1, wherein the rectifier has a plurality of controllable half-bridges each having two switching elements which are connected to one another via a connecting point which forms the AC voltage phase of the relevant half-bridge, and series inductances are provided between the AC voltage phases of the half-bridges and the phases of the AC voltage connection.

6. The charging and heating circuit as claimed in claim 5, wherein the half-bridges connect a positive busbar and a negative busbar to one another.

7. The charging and heating circuit as claimed in claim 1, wherein the rectifier has a diode bridge which has two diodes connected to one another in series via a connecting point, wherein a neutral conductor contact of the AC voltage connection is directly connected to the connecting point of the diode bridge.

8. A vehicle electrical system having a charging and heating circuit as claimed in claim 1 and an accumulator which is connected directly or indirectly to the DC voltage connection of the charging and heating circuit.

9. The vehicle electrical system as claimed in claim 8, wherein the accumulator is connected to the DC voltage connection of the charging and heating circuit via two DC-DC converters, wherein the DC-DC converters comprise link circuit capacitors which are formed by capacitors in the charging and heating circuit and the charging and heating circuit comprises a configuration circuit which is set up to connect the link circuit capacitors or inputs of the DC-DC converters selectably in parallel or in series with one another.

10. The charging and heating circuit as claimed in claim 2, wherein the heating resistor is connected to the rectifier via a switch.

11. A charging and heating circuit comprising:
an AC voltage connection;
a DC voltage connection; and
a rectifier which is connected between the AC voltage connection and the DC voltage connection;
a heating resistor which is selectably connected to the rectifier and the rectifier to supplies the heating resistor with current,
wherein charging and heating circuit is configured such that:
  a) an input of the rectifier is connected to the AC voltage connection and the heating resistor is selectably i) directly connected to the input of the rectifier or ii) disconnected from the input of the rectifier, and
  b) an output of the rectifier is connected to the DC voltage terminal and the heating resistor is selectably i) connected to the output of the rectifier or ii) disconnected from the output of the rectifier, or
wherein the heating resistor connects an input of the rectifier to an output of the rectifier.

\* \* \* \* \*

UNITED STATES PATENT AND TRADEMARK OFFICE
CERTIFICATE OF CORRECTION

PATENT NO. : 12,122,254 B2
APPLICATION NO. : 17/793740
DATED : October 22, 2024
INVENTOR(S) : Franz Pfeilschifter and Martin Götzenberger It is certified that error appears in the above-identified patent and that said Letters Patent is hereby corrected as shown below:

In the Claims

In Column 8, Line 17 of Claim 1: delete "rectifier to" and insert -- rectifier --.

In Column 10, Line 5 of Claim 11: delete "rectifier to" and insert -- rectifier --.

Signed and Sealed this
Seventeenth Day of December, 2024

Derrick Brent
*Acting Director of the United States Patent and Trademark Office*